(No Model.) 2 Sheets—Sheet 1.

A. SHARP.
MECHANICAL MOVEMENT.

No. 531,340. Patented Dec. 25, 1894.

Witnesses:
S. B. Brewer
Edmund Savage

Inventor:
Alonzo Sharp,
by William H. Low,
Attorney.

(No Model.) 2 Sheets—Sheet 2.

A. SHARP.
MECHANICAL MOVEMENT.

No. 531,340. Patented Dec. 25, 1894.

Witnesses:
S. B. Brewer
Edmund Savage

Inventor:
Alonzo Sharp,
By William H. Low
Attorney.

United States Patent Office.

ALONZO SHARP, OF TROY, NEW YORK.

MECHANICAL MOVEMENT.

SPECIFICATION forming part of Letters Patent No. 531,340, dated December 25, 1894.

Application filed February 24, 1894. Serial No. 501,375. (No model.)

*To all whom it may concern:*

Be it known that I, ALONZO SHARP, of Troy, in the county of Rensselaer and State of New York, have invented a new and useful Mechanical Movement, of which the following is a specification.

My invention relates to mechanism for automatically effecting a reversal of the direction of rotative movement in a revolving body in such manner that a predetermined number of rotations of said body can be alternately made in opposite directions.

Figures 1, 2:
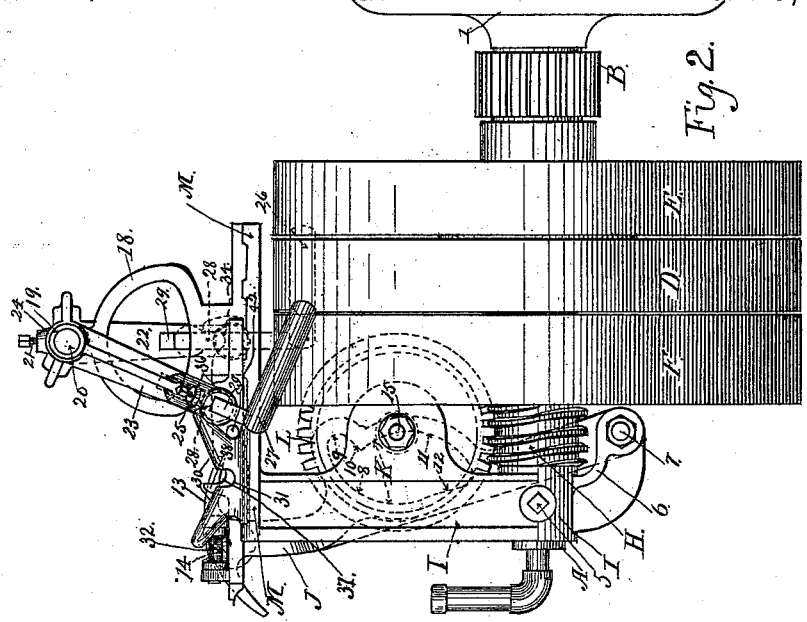
Figure 4:
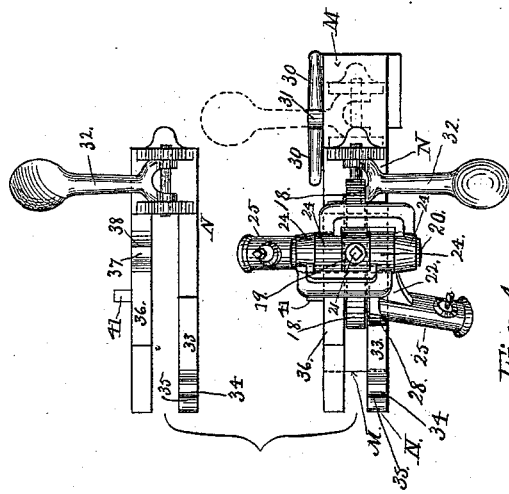
Figure 3:
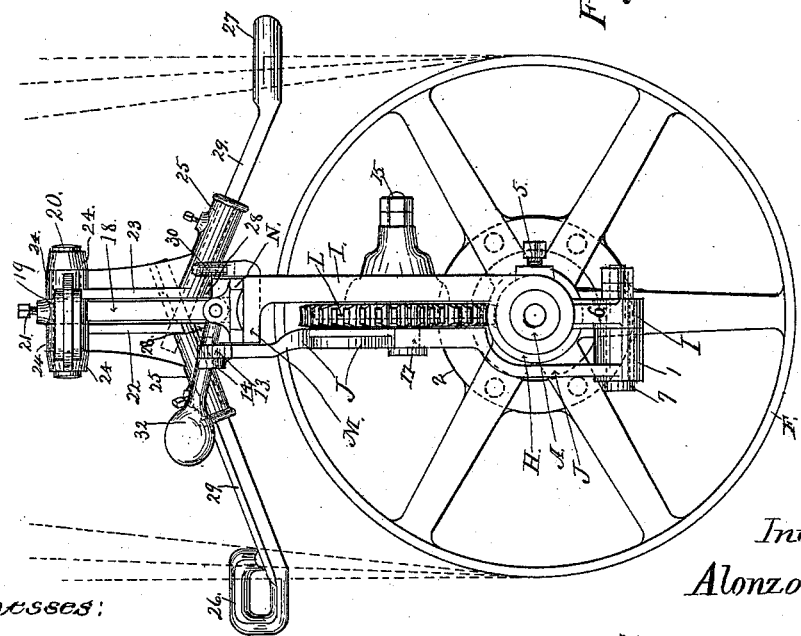

In the accompanying drawings, which are herein referred to and form part of this specification, Figure 1 is a front elevation of my invention, with portions broken away to show underlying parts. Fig. 2 is a rear elevation of my invention. Fig. 3 is an end elevation; and Fig. 4 is a plan view of the sliding-block for operating the belt-shippers.

This invention is designed for machines which are driven by two driving-belts which are arranged to move in opposite directions and which are alternately brought into position, in respect to a driven pulley, to effect the rotations of the revolving parts of the machine in opposite directions.

As represented in the drawings, A designates a fixed stud or dead-spindle which is held by a bracket, 1, which may be secured to the frame-work or other stationary part of the machine to which my invention is to be applied.

B designates a toothed pinion which is fitted to revolve upon the stud A and is provided with a sleeve, C, having a circular flange, 2, at the end opposite to the one on which said pinion is located.

D designates the driven-pulley which is secured to the flange 2 so as impart a rotatory motion—derived from a driving-pulley, not shown in the drawings—to the pinion B which is intended to mesh into a spur-wheel—not shown—so as to impart a rotatory motion to a machine to which my invention is applied.

E designates a split-pulley fitted to rotate on the sleeve C loosely so that the motion of said pulley cannot be imparted to the pinion B. Said pulley is divided diametrically into two equal parts held together by bolts, 3, which pass through lugs, 4, provided for that purpose. Said pulley is an idler- or loose-pulley which has no direct part in imparting motion to the machine to which my invention is applied. The pulleys D and E are preferably made with the same width of rim.

F designates a loose-pulley fitted to rotate on the stud A and provided with a sleeve, G, having on its outer end a worm, H, for a purpose hereinafter explained, and said worm may either be integral with the sleeve G or secured thereto. The pulley F, while of a uniform diameter with the others, should have greater width of face than the pulleys D and E, so that the greater width of belt used on said pulley—when shifted to drive the pulley D—will overlap onto the pulley F and, by imparting motion to the latter, keep the worm H continuously rotating for a purpose hereinafter explained.

I designates a bracket secured to the stud A, by means of a set-bolt, 5, so as to remain stationary near the outer end of said stud. Said bracket forms a collar to prevent the pulleys and their attached parts from getting out of place on said stud. The bracket I has a bent arm, 6, at its lower end, and in said arm a pivot, 7, is secured to form a center on which a lever, J, is arranged to vibrate. The lever J has an opening, K, formed therein, and said opening is composed of an upper concave, 8, which is succeeded by a notch, 9, whereby a shoulder, 10, is formed. The latter is succeeded by a downwardly-sweeping concave, 11, which joins to a vertical face, 12, which joins to the concave 8 to complete the outline of said opening, which is formed for a purpose that will be shortly described. The upper end of the lever J is provided with an arch-shaped head, 13, having in its middle a notch, 14, for receiving a locking-device as hereinafter described.

L designates a worm-wheel that is journaled on a stud, 15, secured in the bracket I. Said worm-wheel meshes into the screw-thread formed on the worm H, and thereby the worm-wheel L will acquire a speed proportioned to the number of teeth contained in said wheel, and it is evident that, by increasing the number a slower speed of the worm-wheel will be obtained than by a decreased number of teeth on said worm-wheel, the pitch of the screw on the worm remaining the same in both cases. The end of the stud 15 is provided with a spur, 16, which, by taking against the opposite sides of the opening K, forms a stop to prevent the lever J from passing beyond the proper point at either extremity of its movement. A wrist-pin, 17, is secured in the worm-wheel L and is fitted to move in the opening K in such manner as to produce intermittent vibrations of the lever J in opposite directions;—the vibrations of said lever being separated from each other by intervening periods of rest of substantially the same duration as the intervals of movement, the two intervals of rest occurring while the wrist-pin 17 is moving around the concaves 8 and 11, and the periods of movement while said wrist-pin is engaged with the shoulder 10 and vertical face 12, said intervals of rest corresponding to the time during which one or the other of the driving-belts is engaged on the pulley D to impart motion to the machine to which my invention is applied.

M designates a guide formed on or attached to the upper part of the bracket I. Projecting upwardly from the face of said guide is an open yoke, 18, having at its upper side an eye, 19, in which a stationary arbor, 20, is secured by a set-bolt, 21, in such manner that said arbor will project from both faces of said eye. Said arbor forms a fixed center upon which a pair of belt-shipper arms, 22 and 23, or other pendulous arms can be arranged to vibrate independently of each other at opposite sides of the eye 19. The upper end of each of said arms is provided with a pair of eyes, 24, which are arranged to form an interlocking device with the eye 19 and with the eyes of the like arm on the opposite side of the eye 19, as shown in Fig. 4. The lower end of each belt-shipper arm is provided with a socket, 25, for receiving an adjustable belt-shipper, 26 and 27, and pendent from each socket is a tooth, 28, for a purpose explained herein.

The inner end of each belt-shipper is provided with a bar, 29, which fits into the corresponding socket 25 and projects from the inner end of the latter to form a stop which—by taking against the side of the opening of the yoke 18—will prevent the belt-shipper from moving beyond a prescribed distance. At the rearward edge of the guide M is a standing-flange provided with a V-shaped depression, 30, having a notch, 31, at its middle.

N designates a slide fitted to move in the guide M and having a latch, 32, hinged thereto so as to swing over to extend from opposite edges of said slide. Said latch is fitted to engage in the notch 14—in the lever J—to impart a reciprocating motion to the slide N, and it is also fitted to engage in the notch 31, for the purpose of locking said slide in a fixed position. The slide N is bifurcated to allow it to pass on opposite sides of the yoke 18, and one of the arms of said slide is provided with a seat or rest, 33, on which the tooth 28—of the arm 22—will bear while a belt is on the pulley E. At the end of said seat that is farthest from the latch 32, there is a notch, 34, for receiving the tooth last referred to, and a lug, 35, which will take against said tooth and force the latter to enter said notch. The opposite arm of the slide N has a seat or rest, 36, on which the tooth of the arm 23 will bear during the time that a belt is running on the pulley F. At one end of said seat there is a notch, 37, and a lug, 38, arranged to take against the tooth of the arm 23 so as to force said tooth into said notch. By means of either tooth becoming engaged in the notch appropriated thereto the corresponding belt-shipper will be positively moved to shift the corresponding driving-belt on to the pulley D—and while said movement is occurring, the other belt-shipper is held in an immovable position by reason of its tooth bearing on the seat on said slide provided for that purpose—and thereby motion will be imparted to the pinion B in a direction corresponding to the direction of movement of said belt, and it should be understood that two belts—one straight and the other twisted—are required to operate my invention.

The stud A is bored longitudinally to form a lubricant-chamber, 39, for containing a quantity of liquid lubricant for lubricating the parts revolving on said stud. Leading from said lubricant-chamber is a number of oil-holes, 40, for conducting the lubricant to the bore of the revolving parts on the stud A. The sleeve C is also provided with oil-holes, 41, for conducting lubricant to the bore of the pulley E.

When the latch 32 is released from the notch 14, the slide N can be operated by hand, the latch being used for a handle to effect the movement of said slide, and, to prevent the latter from being drawn too far outwardly, a stop-pin, 42, is inserted in said slide and fitted to take against a stationary portion of the guide M.

The worm H is continuously rotated in one direction so that the wrist-pin 17 of the worm-wheel L will always travel in the required direction to produce a proper vibratory movement of the lever J, that is to say, so that said wrist-pin will pass over the different faces of the opening K in their proper order.

My invention operates in the following manner: Let it be premised that a driving-belt is running on the pulley D to rotate the worm H in a direction that will cause the worm-wheel L to revolve in the direction indicated by the arrow on Fig. 1, then, when the wrist-pin 17 is moved to take against the vertical face 12, the lever J will be moved to carry it to the opposite limit of its vibratory movement, and, in making said movement, the lever J will correspondingly move the slide N to the opposite limit of its reciprocating movement. If, just before making the last described movement, the open belt has been driving the pulley D and the crossed belt has been driving the pulley F, the movement of the slide N will cause the open belt to be shifted—by the belt-shipper that controls said open belt—from the pulley D to the pulley E, and when this is accomplished, but not before, the belt-shipper that controls the twisted belt will cause the latter to be moved to the pulley D, whereby the direction of the motion of pinion B will be reversed and the machine to which my invention is applied will thereby have its motion reversed. During the time in which the belt for driving the pulley F is driving the pulley D, the overlapping edge of said belt remaining on the pulley F, will continue to rotate the latter and thereby the worm H will continue to rotate the worm-wheel L in the required direction to impart the proper motion to the lever J to alternately shift the belts to operate in the manner above described.

The operation of my invention can be terminated by disengaging the latch 32 from the notch 14 and swinging said latch to engage in the notch 31, whereby the slide N will be held in a position to retain the belts upon the pulleys E and F.

My invention can be arranged to control belts running in a horizontal direction when required, the change being effected by turning the bracket I horizontally on the stud A, instead of having it stand vertically as shown in the drawings.

It is obvious that the driven-pulley D can be secured to a revolving shaft which is required to be rotated in opposite directions, and in such cases the idler-pulley E will be fitted to revolve loosely on said shaft and the pinion B omitted.

What I claim as my invention, and desire to secure by Letters Patent, is—

1. A mechanical movement, consisting of three pulleys of equal diameter—of which the two outer ones are idlers adapted to rotate in opposite directions in relation to each other, a worm attached to one of said idlers, a worm-wheel fitted to mesh into said worm and having a wrist-pin fixed eccentrically therein, a vibratile lever provided with an opening formed substantially as described; the perimeter of said opening being arranged to bear against said wrist-pin and adapted to effect alternating intervals of motion and rest for said lever, a slide operated by said lever and arranged to alternately take against a pair of pendulous-arms loosely pivoted on a stationary center, and a belt-shipper attached to each of said arms; said belt-shippers being arranged to operate independently of each other and to shift a pair of belts which move in opposite directions; whereby the middle pulley will be alternately rotated in opposite directions, as and for the purpose herein specified.

2. The combination of vibratile lever, J, arranged to receive alternating periods of rest and motion, a pair of belt-shipper arms, 22 and 23, each having a tongue, 28, and a belt-shipper, and a slide, N, operated by said lever and provided with seats, 33 and 36, and with notches, 34 and 37; said notches being arranged to consecutively engage with one of said tongues while the other tongue is held on a seat, as and for the purpose herein specified.

3. The combination of a vibratile lever, J, having a notch, 14, in its free end, a slide, N, having a latch, 32, jointed to said slide, and a stationary guide, M, having a standing flange provided with a notch, 31, adapted to receive said latch, whereby said slide can be locked in a fixed position, as herein specified.

4. The combination, with three pulleys—of which the two outer ones are idlers and are adapted to rotate in opposite directions, of a pair of belt-shippers arranged at opposite sides of said pulleys and fitted to move independently of each other, and the mechanism herein described for operating said belt-shippers: whereby one of the latter will be automatically moved to carry a belt into line with one of the idler-pulleys while the other belt-shipper is in position to run a belt on the middle pulley, substantially as herein specified.

5. The combination of a bracket having an eye, 19, an arbor, 20, held stationary in said eye, and a pair of belt-shipper arms, 22 and 23, arranged to vibrate at opposite sides of said eye; the upper end of each of said arms being provided with a pair of eyes, 24, which are fitted to interlock with the pair of eyes of the other arm of said pair and with the eye 19, substantially as herein specified.

6. The combination of a pair of pendulous-arms, 22 and 23, each carrying a belt-shipper provided with an inwardly extending bar, 29, as herein set forth, and an open yoke, 18, into which said bar projects and—by taking against the rim of said yoke—is prevented from being carried beyond the extremity of its proper movement when the belt-shipper is freed from the control of its moving mechanism, as herein specified.

ALONZO SHARP.

Witnesses:
WM. H. LOW,
E. W. SHACKLETON.